US009524585B2

(12) United States Patent
Steed et al.

(10) Patent No.: US 9,524,585 B2
(45) Date of Patent: Dec. 20, 2016

(54) CONSTRUCTING AUGMENTED REALITY ENVIRONMENT WITH PRE-COMPUTED LIGHTING

(71) Applicant: MICROSOFT TECHNOLOGY LICENSING, LLC, Redmond, WA (US)

(72) Inventors: Jonathan Steed, Redmond, WA (US); Aaron Krauss, Snoqualmie, WA (US); Mike Scavezze, Bellevue, WA (US); Wei Zhang, Redmond, WA (US); Arthur Tomlin, Bellevue, WA (US); Tony Ambrus, Seattle, WA (US); Brian Mount, Seattle, WA (US); Stephen Latta, Seattle, WA (US); Ryan Hastings, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 168 days.

(21) Appl. No.: 13/668,953

(22) Filed: Nov. 5, 2012

(65) Prior Publication Data

US 2014/0125668 A1    May 8, 2014

(51) Int. Cl.
*G06T 19/00*    (2011.01)
*G06T 15/50*    (2011.01)

(52) U.S. Cl.
CPC ............. *G06T 19/006* (2013.01); *G06T 15/50* (2013.01); *G06T 2215/16* (2013.01)

(58) Field of Classification Search
CPC ....... G06T 19/006; G06T 15/50; G02B 27/017
(Continued)

(56) References Cited

U.S. PATENT DOCUMENTS 6,124,864 A * 9/2000 Madden et al. .............. 345/473
6,389,375 B1 * 5/2002 Thomsen ................ G06T 17/10
345/420

(Continued)

FOREIGN PATENT DOCUMENTS

CN    101246600 A    8/2008
EP    1204046 A1    5/2002
WO    2013049889 A1    4/2013

OTHER PUBLICATIONS

Sloan, Peter-Pike, Jan Kautz, and John Snyder. "Precomputed radiance transfer for real-time rendering in dynamic, low-frequency lighting environments." ACM Transactions on Graphics (TOG). vol. 21. No. 3. ACM, 2002.*

(Continued)

*Primary Examiner* — Ryan M Gray
(74) *Attorney, Agent, or Firm* — Dan Choi; Micky Minhas

(57) ABSTRACT

Embodiments related to efficiently constructing an augmented reality environment with global illumination effects are disclosed. For example, one disclosed embodiment provides a method of displaying an augmented reality image via a display device. The method includes receiving image data, the image data capturing an image of a local environment of the display device, and identifying a physical feature of the local environment via the image data. The method further includes constructing an augmented reality image of a virtual structure for display over the physical feature in spatial registration with the physical feature from a viewpoint of a user, the augmented reality image comprising a plurality of modular virtual structure segments arranged in adjacent locations to form the virtual structure feature, each modular virtual structure segment comprising a pre-com- (Continued)

puted global illumination effect, and outputting the augmented reality image to the display device.

18 Claims, 6 Drawing Sheets

(58) Field of Classification Search
USPC .......................................... 345/419, 420, 426
See application file for complete search history.

(56) References Cited

U.S. PATENT DOCUMENTS

| | | | |
|---|---|---|---|
| 6,396,495 B1* | 5/2002 | Parghi et al. | 345/426 |
| 7,249,005 B2* | 7/2007 | Loberg | 703/1 |
| 7,457,730 B2* | 11/2008 | Degnan | 703/1 |
| 8,139,059 B2 | 3/2012 | Trepte | |
| 8,668,498 B2* | 3/2014 | Calman et al. | 434/80 |
| 8,721,337 B2* | 5/2014 | Calman et al. | 434/93 |
| 2003/0179218 A1* | 9/2003 | Martins et al. | 345/633 |
| 2007/0195090 A1* | 8/2007 | Birdwell | 345/426 |
| 2007/0262982 A1* | 11/2007 | Ninomiya | 345/419 |
| 2008/0071559 A1* | 3/2008 | Arrasvuori | 705/1 |
| 2010/0289817 A1* | 11/2010 | Meier et al. | 345/619 |
| 2011/0175913 A1 | 7/2011 | Sloan et al. | |
| 2011/0216002 A1 | 9/2011 | Weising et al. | |
| 2011/0234631 A1 | 9/2011 | Kim et al. | |
| 2012/0249741 A1* | 10/2012 | Maciocci et al. | 348/46 |

OTHER PUBLICATIONS

Kristensen, Anders Wang, Tomas Akenine-Möller, and Henrik Wann Jensen. "Precomputed local radiance transfer for real-time lighting design." ACM Transactions on Graphics (TOG). vol. 24. No. 3. ACM, 2005.*

Loos, et al., "Delta Radiance Transfer", Retrieved at <<http://www.cs.utah.edu/~loos/publications/drt/drt.pdf>>, ACM SIGGRAPH Symposium on Interactive 3D Graphics and Games 2012>>, Mar. 9, 2012, pp. 1-6.

Tsingos, Nicolas, "Pre-Computing Geometry-Based Reverberation Effects for Games", Retrieved at <<http://www-sop.inria.fr/reves/Nicolas.Tsingos/publis/ntsin_aes35_reverb.pdf>>, Proceedings of AES 35th International Conference: Audio for Games, London, UK, Feb. 11, 2009, pp. 1-10.

Jung, et al., "Enhancing X3D for advanced MR appliances", Retrieved at <<http://www-past.igd.fraunhofer.de/~yjung/pubs/07X3DforMR.pdf>>, Proceedings of Web3D '07 Proceedings of the twelfth international conference on 3D web technology, Apr. 15, 2007, pp. 27-37.

Fuchs, Carsten, "Methods for Real-Time Lighting", Retrieved at <<http://www.cafu.de/files/Uni-DA-RealTimeLighting.pdf>>, Feb. 18, 2005, pp. 1-122.

Green, Chris, "Efficient Self-Shadowed Radiosity Normal Mapping", Retrieved at <<http://www.valvesoftware.com/publications/2007/SIGGRAPH2007_EfficientSelfShadowedRadiosityNormalMapping.pdf>>, Proceedings of Advanced Real-Time Rendering in 3D Graphics and Games Course—SIGGRAPH 2007, Aug. 8, 2007, pp. 1-4.

Diverdi, Stephen, "Towards Anywhere Augmentation", Retrieved at <<http://techtransfer.universityofcalifornia.edu/NCD/Media/DiVerdi.pdf>>, Sep. 2007, pp. 168.

Loscos, et al., "Interactive Virtual Relighting and Remodeling of Real Scenes", Retrieved at <<http://hal.inria.fr/docs/00/06/99/42/PDF/RT-0230.pdf>>, Proceedings of Eurographics Rendering Workshop 1999, Granada, Spain, Apr. 1999, pp. 1-19.

"Augmented Lighting Environments", U.S. Appl. No. 12/416,397, filed Apr. 1, 2009, pp. 28.

European Patent Office, Extended European Search Report of European Patent Application No. 13198216.7, Germany, Mar. 21, 2014, 10 Pages.

Riera, et al., "Lighting Simulation in Augmented Reality Scenes: Teaching Experience in Interior Design", In Proceedings of the 7th Iberian Conference on Information Systems and Technologies, Jun. 20, 2012, pp. 1-6.

Hyvarinen, Juha, "Surface Reconstruction of Point Clouds Captured with Microsoft Kinect", A Bachelor's Thesis, Degree Programme in Information Technology and Telecommunications, Oulu University of Applied Sciences, Available as early as Mar. 2012, pp. 1-49.

Wang, et al., "Relighting in Spatial Augmented Reality", In International Conference on Audio Language and Image Processing, Nov. 23, 2010, pp. 224-229.

Kanbara, M. et al., "A Stereoscopic Video See-through Augmented Reality System Based on Real-time Vision-based Registration," IEEE Virtual Reality, Mar. 18, 2000, 8 pages.

Sloan, P. et al., "Precomputed Radiance Transfer for Real-Time Rendering in Dynamic, Low-Frequency Lighting Environment," 29th Annual Conference on Computer Graphics and Interactive Techniques—SIGGRAPH '02, Jul. 23, 2002, 10 pages.

Hilton, A., "Scene Modelling from Sparse 3D Data," Image and Vision Computing, vol. 23, No. 10, Sep. 20, 2005, 21 pages.

Ventura, J. et al., "Online Environment Model Estimation for Augmented Reality," 8th IEEE International Symposium on Mixed and Augmented Reality—ISMAR 2009, Oct. 19, 2009, 4 pages.

Van Krevelen, D. et al., "A Survey of Augmented Reality Technologies, Applications and Limitations," The International Journal of Virtual Reality, vol. 9, No. 2, Jun. 2010, 19 pages.

ISA European Patent Office, Invitation to Pay Additional Fees and, where Applicable, Protest Fee Issued in Application No. PCT/US2013/068363, Feb. 23, 2015, WIPO, 11 pages.

ISA European Patent Office, International Search Report and Written Opinion Issued in Application No. PCT/US2013/068363, May 4, 2015, WIPO, 19 pages.

The State Intellectual Property Office of China, First Office Action Issued in Chinese Patent Application No. 201310757195.X, Feb. 26, 2016, China, 11 pages.

* cited by examiner

CONSTRUCTING AUGMENTED REALITY ENVIRONMENT WITH PRE-COMPUTED LIGHTING

BACKGROUND

The addition of realistic lighting and shadows to virtual environments, such as a virtual video game environment, may be computationally expensive. As such, rendering times for lighting effects may be unacceptably long for use during video game play. For example, the creation of texture maps that encode realistic lighting (e.g. global illumination) and shadows ("light maps") on a virtual environment may take hours, or even days, to compute. Thus, such lighting effects are generally pre-computed for a virtual environment during development of the virtual environment, rather than being calculated in real-time during game play.

Dynamic lighting and shadowing may be computed more quickly. However, the visual quality of dynamic lighting may be much lower than that of pre-computed lighting effects. Further, dynamic lighting may utilize significant resources at run-time.

SUMMARY

Various embodiments are disclosed that relate to efficiently constructing an augmented reality environment with global illumination effects. For example, one disclosed embodiment provides a method of displaying an augmented reality image via a display device. The method includes receiving image data capturing an image of a local environment of the display device, and identifying a physical feature of the local environment via the image data. The method further includes constructing an augmented reality image of a virtual structure for display over the physical feature in spatial registration with the physical feature from a viewpoint of a user, the augmented reality image comprising a plurality of modular virtual structure segments arranged in adjacent locations to form the virtual structure feature, each modular virtual structure segment comprising a pre-computed lighting effect, and outputting the augmented reality image to the display device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
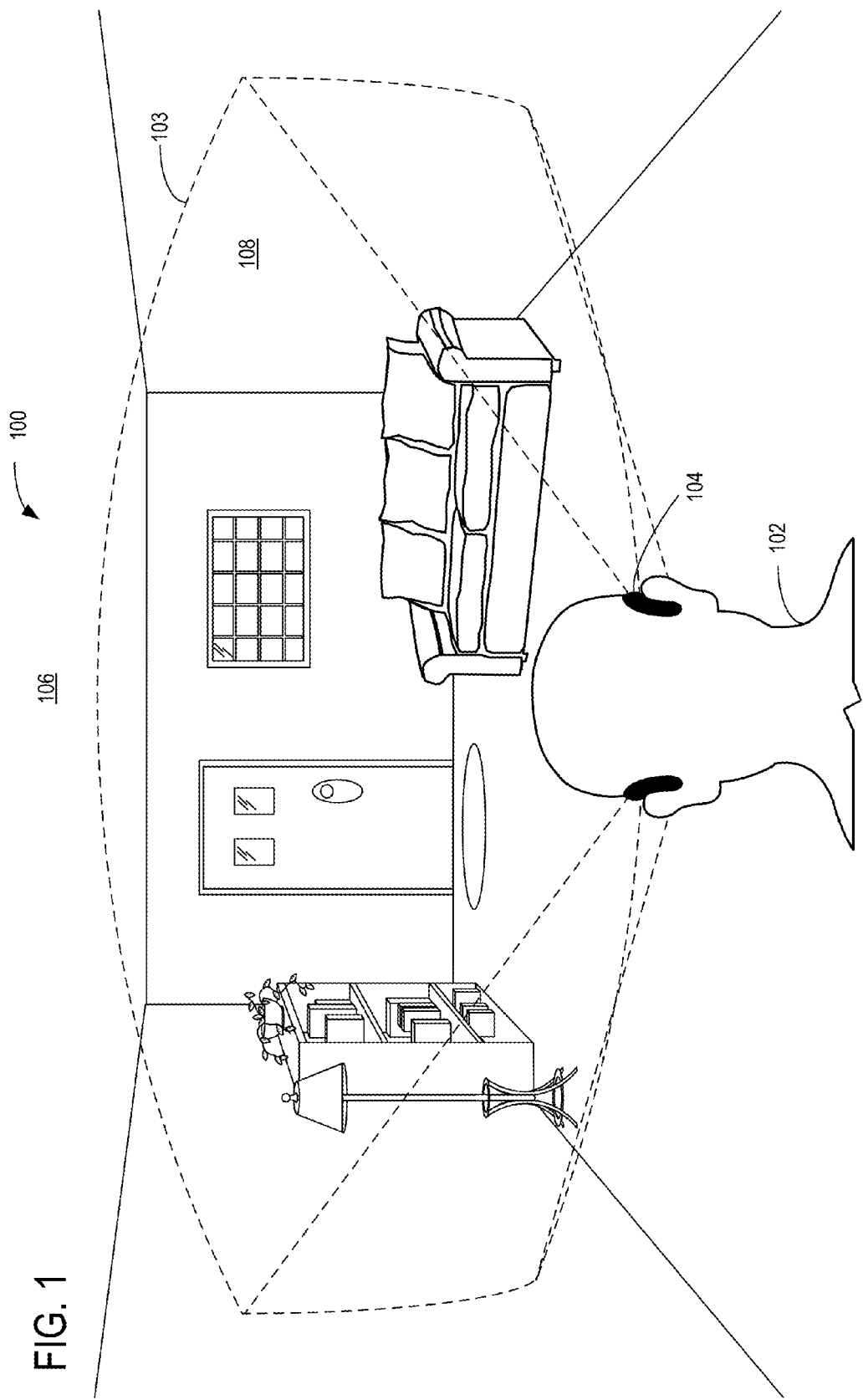
FIG. 1 shows an example embodiment of a see-through display device in an example use environment.

As mentioned above, realistic lighting effects for a virtual environment are generally pre-computed after the virtual environment has been constructed, and then stored, for example, as light maps for the virtual environment. Such virtual environments are commonly built with fixed geometries that do not adapt to a user's surroundings.

In contrast, an augmented reality display system may be configured to adapt a virtual image to a user's surroundings. For example, an augmented reality video game may fit virtual structures in the game to corresponding physical structures of a physical environment of the user. Thus, the geometries of the augmented reality image objects may change based upon the physical environment of the user.

As the fitting of the augmented reality environment to the physical environment occurs during real-time use, if high quality lighting effects were applied to the environment after building the environment, the lighting computations would also occur at this time. However, if such lighting effects were to be computed for an augmented reality environment after fitting augmented reality imagery to the physical environment, a user may have to wait from hours to days to play an augmented reality experience, depending upon the particular computing system used to compute the lighting effects, due to the computational expense of applying realistic lighting effects. This may result in an unacceptably slow user experience. Further, the appearance of the physical environment may change during such a long delay. This may result in a mismatch between the real world and virtual world, which may significantly impact an augmented reality experience.

As one potential solution, dynamic lighting may be used in place of pre-computed lighting effects for an augmented reality environment. However, as mentioned above, dynamic lighting may be of lower quality than pre-computed lighting, and therefore may not provide as good of a user experience. Further, dynamic lighting may be computationally expensive at run-time, which may decrease computation budgets for other aspects of the experience, such as other visuals and game play.

Therefore, embodiments are disclosed herein that relate to the efficient construction of an augmented reality environment, with high quality pre-computed lighting effects, that is fit to the geometry of a local physical environment. Briefly, the disclosed embodiments utilize modular virtual structure segments that may be arranged adjacent to one another to form a virtual structure for an augmented reality image, wherein the modular virtual structure segments comprise high-quality pre-computed lighting effects. As the lighting effects are pre-computed for each modular virtual structure segment, the lighting effects will be included in a virtual structure constructed via the modular virtual structure segments. Further, in some embodiments, local lighting characteristics may be detected, and used to modulate an appearance of the modular virtual structure segments. Examples of such local lighting characteristics may include, but are not limited to, color characteristics and locations of light sources in the local physical environment.

FIG. 1 shows an example embodiment of a use environment 100 for an augmented reality display system, in the form of a living room. A user 102 is shown viewing the living room through a see-through display device 104. FIG. 1 also depicts a field of view 103 of the user, which represents a portion of the environment viewable through the see-through display device 104, and thus the portion of the environment that may be augmented with images displayed via the see-through display device 104. In some embodiments, the user's field of view 103 may be substantially coextensive with the user's actual field of vision, while in other embodiments the user's field of view 103 may occupy a lesser portion of the user's actual field of vision.

As will be described in greater detail below, see-through display device 104 may comprise one or more outwardly facing image sensors (e.g., two-dimensional cameras and/or depth cameras) configured to acquire image data (e.g. color/grayscale images, depth images/point cloud data/mesh data, etc.) representing use environment 100 as the user navigates the environment. This image data may be used to obtain information regarding the layout of the environment and structural features thereof, such as ceiling 106 and walls 108, as well as other features.

See-through display device 104 further is configured to overlay displayed virtual objects over physical objects viewable through the device to create an augmented reality image. For example, referring to FIG. 2, an example augmented reality image is depicted in which virtual room framing structures 200, such as virtual wall studs 202, headers 204, etc., are displayed as an overlay on the user's wall. Infrastructure images, such as pipes 206, conduit/cables, etc. also may be displayed, as well as any other suitable virtual structures. Similar structures (not shown) may be displayed for the ceiling as well. Additionally, imagery may be displayed corresponding to furniture or other non-structural objects in a room, and as occupying an empty space within a room. It will be appreciated that the augmented reality image as depicted in FIG. 2 is not limited to the user's field of view shown in FIG. 1 in order to illustrate the augmented reality environment more completely.

Figure 2:
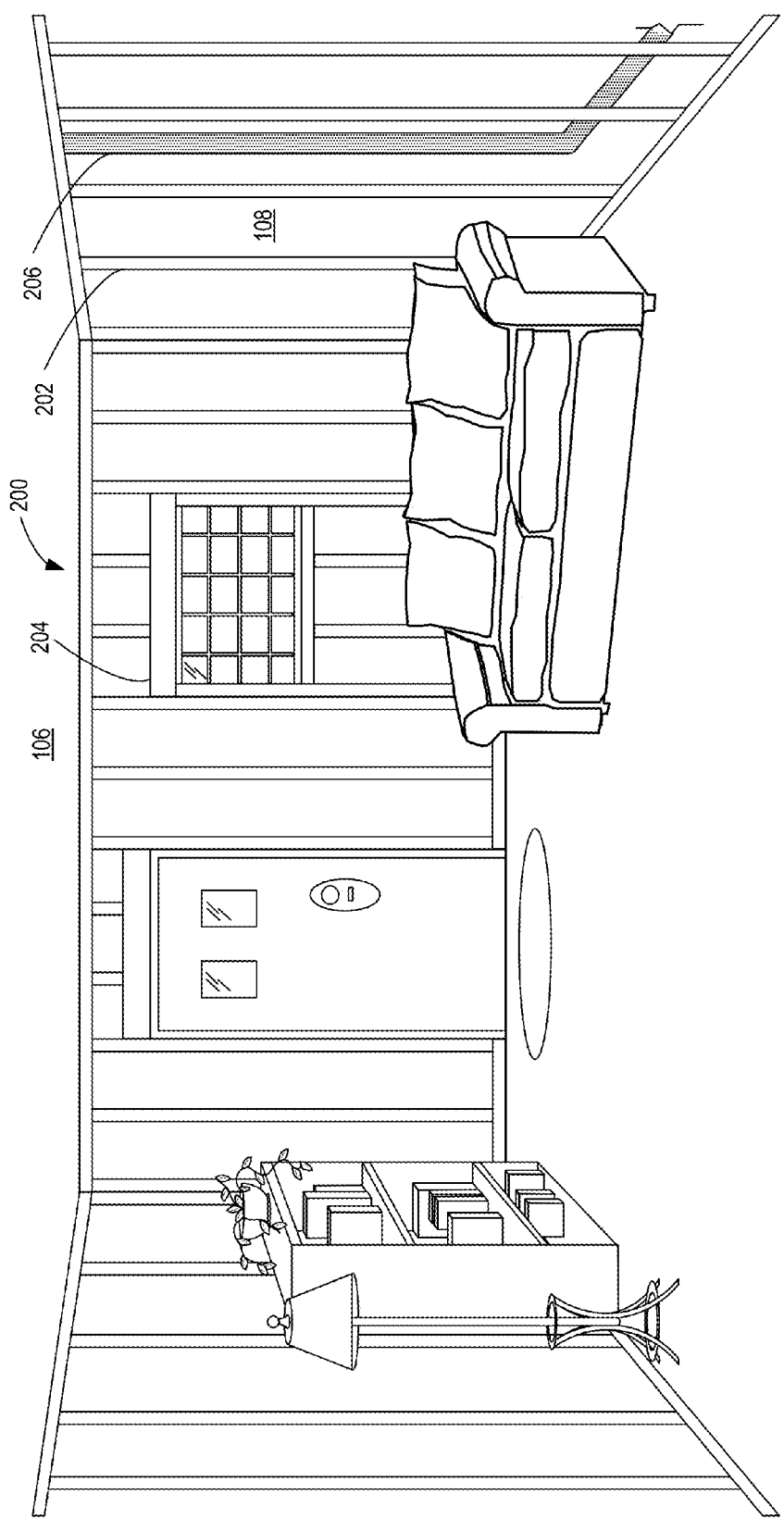
FIG. 2 shows an embodiment of an augmented reality image in the example use environment of FIG. 1.

The virtual wall framing structures of FIG. 2 are geometrically fit to the underlying physical structures (e.g. walls 108). As the local physical environment of each user will likely differ, the overall virtual structures for each player's local physical environment are constructed upon acquiring image data (e.g. stereo depth image data, structured light image data, time-of-flight image data, or other depth image data) of the local physical environment, rather than being pre-designed. As such, if global illumination effects were to be applied to the virtual structures after constructing the virtual structures, a player may be forced to wait an undesirably long time before the activity could be played, and may be restricted from changing environments (e.g. walking into a different rooms) during a game, as building and applying lighting to the new environment may take an unsuitably long period of time.

Figure 3:
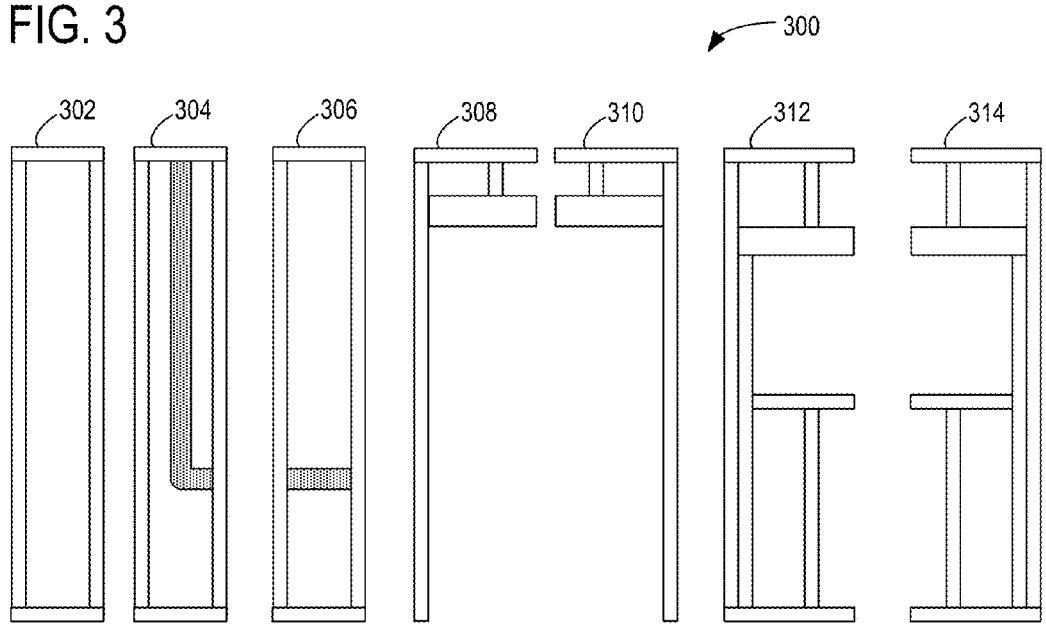
FIG. 3 shows an example embodiment of a set of modular virtual structure segments.

Thus, as mentioned above, virtual structures 200 are assembled from sets of modular virtual structure segments with pre-computed lighting effects, wherein instances of the modular virtual structure segments may be arranged adjacent to each other and processed (e.g. rotated, scaled, etc.) to form the appearance of a unitary virtual structure. FIG. 3 shows an example embodiment of a set 300 of modular virtual structure segments comprising a wall stud segment 302, a wall stud segment with a jointed pipe 304, a wall stud segment with a horizontal pipe 306, a pair of door frame segments 308, 310, and a pair of window frame segments 312, 314. Referring to FIG. 2, it will be noted that virtual structures 200 may be constructed entirely from instances of virtual wall segments selected from set 300 as scaled, rotated, clipped, morphed, and/or otherwise appropriately processed based upon the placement of each particular instance.

While a relatively simple set of modular virtual structure segments is depicted in FIG. 3, it will be understood that a set of modular virtual structure segments may have any suitable number and selection of segments of any desired complexity. Further, it will be understood that sets of modular virtual structure segments with pre-computed lighting may be used to build any other suitable structure to fit any other desired physical feature than a virtual structure fit to a wall, including but not limited to virtual structures that are fit to ceilings, as well as non-structural features such as furniture, wall hangings, plants, exterior objects, counter tops, bar tops, etc. For example, pre-lit modular virtual structure segments may include pre-lit virtual sofas, desks, televisions, mirrors, and other objects that are commonly found in physical environments, but that may have different shapes and/or appearances in different physical environments. It will be understood that such virtual structural segments for such objects in some instances may comprise a single "segment," such that a single virtual structure element is resized, rotated, and otherwise processed to fit a desired physical structure without necessarily being combined with adjacent segments. Additionally, it will be understood that an empty space within a physical environment may be considered a physical feature of the environment, and that modular virtual structure segments may be arranged to construct a virtual object in an unoccupied portion of space within a room or other use environment.

Some modular virtual structure segments may comprise connectivity constraints that restrict a set of other segments that may be joined to the segment. For example, in FIG. 3, each window segment and door segment may be joined on one side (e.g. the window/door side) to another window or door segment, and not a wall stud segment 302 on that side, or the segments would mate incorrectly. Further, jointed pipe 304 and horizontal pipe 306 segments may be restricted to being joined to segments with complementary pipe sections. It will be understood that these connectivity constraints are described for the purpose of example, and that any other suitable connectivity constraints may be used.

Figure 4:
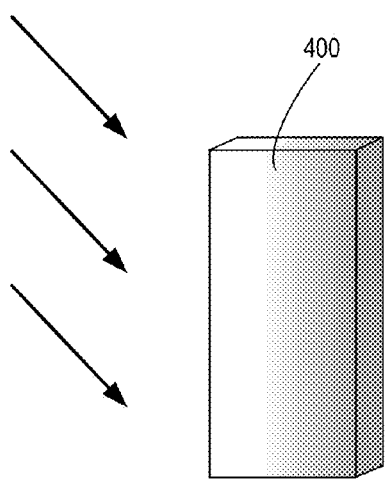
FIG. 4 shows a schematic depiction of a pre-computed lighting effect being applied to a portion of a modular virtual structure segment.

Any suitable pre-computed lighting effect may be applied to the modular virtual structure segments. For example, in some embodiments, a set of modular virtual structure segments may be intended for use in any local lighting environment, without reference to locations of physical lights in the environment. In such embodiments, a directional light effect may be utilized. An example of this is shown in FIG. 4 as directional light incident on a portion 400 of a virtual wall stud segment. The virtual lighting applied may have any suitable direction. For example, for horizontally tiled pieces, the light may be perpendicular to the horizontal axis, while for vertically tiled pieces, the light may be perpendicular to the vertical axis. Additionally, for modular pieces that are tiled both horizontally and vertically, the light may be perpendicular to both axes. This may help to ensure that the shadows and lighting pre-computed for the segments have common lighting characteristics for each segment, and thus may help to prevent the appearance of parallax and/or other discontinuities where adjacent segments meet. In the embodiment of FIG. 4, the directional light is shown as being applied at an approximately forty five degree angle relative to a vertical plane, but it will be understood that this is presented for the purpose of example, and that any other suitable angle may be used.

In other embodiments, a set of modular virtual structure segments may be configured for use with specific lighting characteristics—e.g. a single overhead point light source, a lamp adjacent to a wall, etc. In such embodiments, any suitable type of virtual lighting may be used to pre-compute lighting effects. In any case, after pre-computing the lighting effects, the computed light map may be saved with the associated modular virtual structure segment at a high level of information so that images of virtual structures assembled with the segment have realistic lighting effects.

Figure 5B:
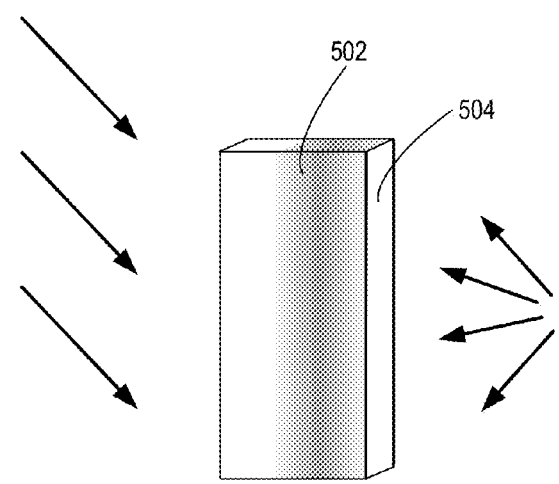
FIG. 5B illustrates an example of the effect of the dynamic point light effect on a portion of a modular virtual structure segment having a pre-computed lighting effect.
Figure 5A:
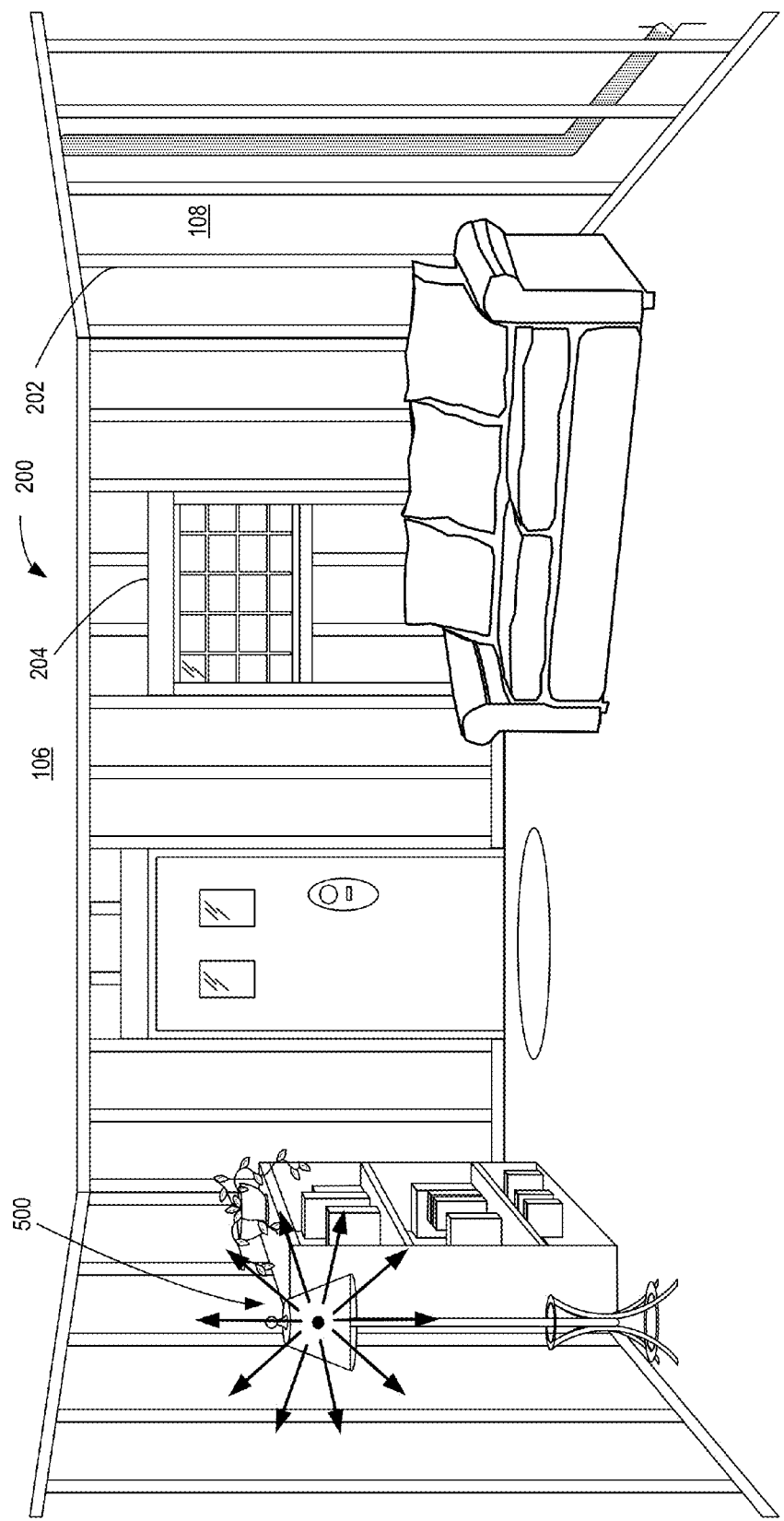
FIG. 5A illustrates an addition of a dynamic point light effect to the augmented reality image of FIG. 2.

Any suitable type of lighting information may be stored for a modular virtual structure segment. For example, pre-computed lighting effects may be stored as light maps, cube maps, spherical harmonics (e.g. pre-computed radiance transfer functions), and/or in any other suitable form. The use of pre-computed radiance transfer functions may allow realistic lighting and shadows on virtual objects to be generated, for example, based upon detected physical light locations in a use environment by applying virtual point lighting at locations of physical lights in a physical environment, as depicted via virtual point light source 500 in FIG. 5A. FIG. 5B shows an example of how the appearance of the wall stud portion shown in FIG. 4 may be modulated based upon the virtual point light source of FIG. 5A. Additionally, procedural or dynamic lighting also may be applied in real time (e.g. light arising from dynamic virtual objects displayed in the augmented reality image).

Local physical lighting characteristics also may be used to modulate an appearance of modular virtual structure segments in other ways. For example, the pre-computed lighting effects for the modular virtual structure segments may be computed based upon the application of white light. Then, when building a virtual image for the particular physical environment, color characteristics of the physical lighting in the physical environment may be analyzed from image data acquired by the see-through display device, and the determined color characteristics (e.g. hue, saturation, albedo) may be applied to the virtual lighting effects so that the virtual lighting matches the local physical lighting more closely. In this way, displayed instances of pre-lit virtual wall/ceiling segments, pre-lit virtual furniture, and any other suitable pre-lit virtual objects may be matched to an appearance of the physical environment more closely.

Figure 6:
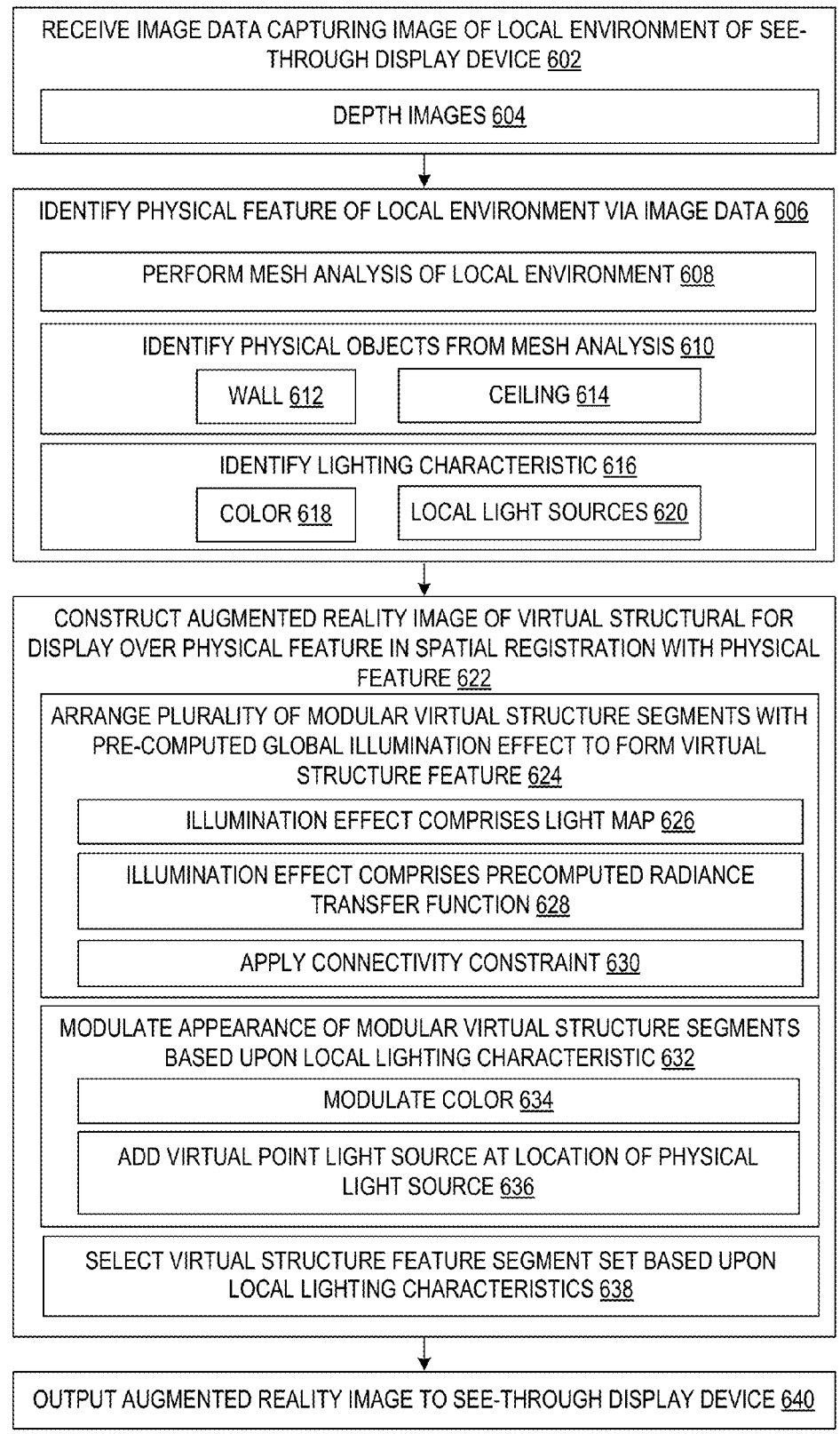
FIG. 6 shows a flow diagram depicting an embodiment of a method for constructing a virtual environment fit to a detected physical environment.

FIG. 6 shows an embodiment of a method 600 for constructing an augmented reality environment by applying instances of modular virtual structure segments to a detected physical structure. Method 600 comprises, at 602, receiving image data capturing an image of a local environment of a see-through display device. The image data may comprise any suitable data, including but not limited to depth images 604 and/or two-dimensional images, and may be received from image sensors on the see-through display device, or external to the see-through display device. The depth image data may be received from any suitable depth imaging system, including but not limited to stereo imaging systems, time-of-flight imaging systems, and structured light imaging systems.

Method 600 next comprises, at 606, identifying a physical feature of the local environment from the image data. The physical feature may be identified in any suitable manner. For example, in some embodiments, a mesh representation of the physical environment is determined from depth image data, and mesh analysis is performed, at 608, to identify, at 610, major surfaces in the physical environment. Examples include, but are not limited to, walls 612 and ceilings 614, as well as features of the walls and ceilings, such as doors, windows, skylights, columns, other protrusions/cutouts in the room, etc. Additionally, open spaces in the geometry may be identified, for example, to allow a desired virtual structure to be fit into the identified open space.

Method 600 also may include, at 616, identifying one or more local lighting characteristics of the physical environment. Examples of local lighting characteristics may include, but are not limited to, color characteristics 618 and locations of local light sources 620.

Method 600 further comprises, at 622, constructing an augmented reality image comprising a virtual structure feature for display over a detected physical feature in spatial registration with the physical feature. As mentioned above and indicated at 624, the virtual structure may be constructed by arranging a plurality of modular virtual structure segments that each comprises a pre-computed lighting effect. The virtual structure segments may be arranged in any suitable manner, including but not limited to by rotating, scaling, morphing, clipping, etc. pieces to fit the physical geometry of interest. Likewise, the modular virtual structure segments may comprise any suitable pre-calculated information regarding the pre-computed lighting effect. Examples include, but are not limited to, light maps 626 and/or radiance transfer functions 628. Further, as described above, connectivity constraints that restrict a set of other modular virtual structure segments that can be joined to a selected modular virtual structure segment may be applied, at 630, when selecting and arranging the modular virtual structure segments to ensure that complementary features are appropriately joined on adjacent segments.

Additionally, as mentioned above, local lighting characteristics may be utilized in constructing the augmented reality image. For example, as indicated at 632, in some embodiments an appearance of the modular virtual structure segments may be modulated based upon local lighting characteristics. The appearance may be modulated in any suitable manner. For example, a color of the local lighting environment may be imparted to the pre-computed lighting effect, as indicated at 634. Likewise, a virtual light source, such as a virtual point light source, may be applied at a location of a physical light source in the environment, as indicated at 636.

In other embodiments, instead of modulating the appearance of the modular virtual structure segments, a plurality of different sets of virtual modular structure segments having different lighting characteristics may be available. For example, one set of modular virtual structure segments may comprise pre-computed light effects corresponding to a point light source overhead, while another may comprise pre-computed light effects corresponding to directional light coming in from a side window. In this instance, as indicated at 638, local lighting characteristics may be utilized to select a set of modular virtual structure segments having corresponding lighting characteristics, so that the resulting virtual structure may have similar lighting characteristics as the physical light in the environment.

Upon constructing the augmented reality image, method 600 comprises outputting the augmented reality image to a see-through display device, as indicated at 640. Sensor data from the see-through display device (e.g. inward and outward image sensors) may be used to detect the user's eye positions and gaze directions, and also to detect physical objects in the field of view of the user, and to display the virtual structure over a corresponding physical feature in spatial registration with the physical feature to give the user an augmented reality view of the physical environment.

Figure 7:
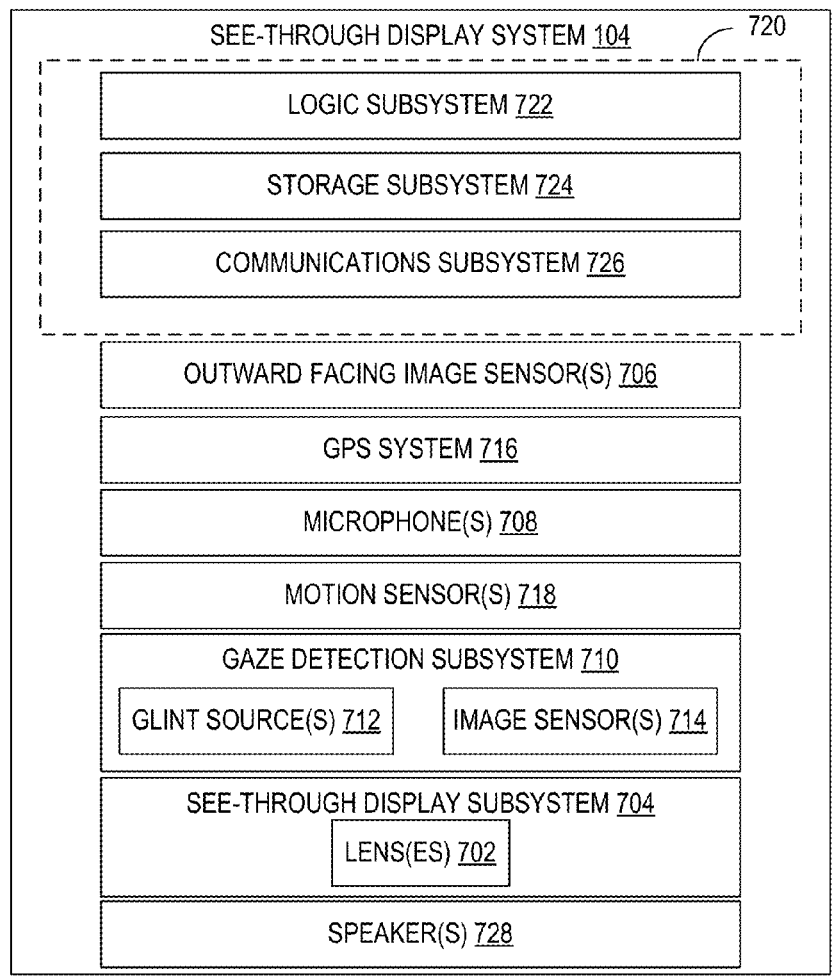
FIG. 7 shows a block diagram of an example embodiment of a see-through display device.

As mentioned above, the methods described above may be performed via any suitable display device. Examples include but not limited to see-through display devices such as head-mounted see-through display device 104 of FIG. 1, and other display devices having one or more image sensors, such as smart phones and notepad computers. FIG. 7 shows a block diagram of an example configuration of see-through display device 104.

See-through display device 104 may comprise one or more lenses 702 that form a part of a near-eye see-through display subsystem 704. See-through display device 104 may further comprise one or more outward facing image sensors 706 configured to acquire images of a background scene being viewed by a user, and may include one or more microphones 708 configured to detect sounds, such as voice commands from a user. Outward facing image sensors 706 may include one or more depth sensors (including but not limited to stereo depth imaging arrangements) and/or one or more two-dimensional image sensors.

See-through display device 104 further comprises a gaze detection subsystem 710 configured to detect a direction of gaze of each eye of a user, as described above. The gaze detection subsystem 710 may be configured to determine gaze directions of each of a user's eyes in any suitable manner. For example, in the depicted embodiment, the gaze detection subsystem 710 comprises one or more glint sources 712, such as infrared light sources, configured to cause a glint of light to reflect from the cornea of each eye of a user, and one or more image sensors 714 configured to capture an image of one or more eyes of the user. Images of the glints and of the pupils as determined from image data gathered via image sensor(s) 714 may be used to determine an optical axis of each eye. It will be understood that the gaze detection subsystem 710 may have any suitable number and arrangement of light sources and image sensors.

See-through display device 104 may further comprise additional sensors. For example, see-through display device 104 may comprise a global positioning (GPS) subsystem 716 to allow a location of see-through display device 104 to be determined.

See-through display device 104 further may include one or more motion sensors 718 to detect movements of a user's head when the user is wearing see-through display device 104. Motion data may be used, for example, for image stabilization to help correct for blur in images from the outward-facing image sensor(s) 706. Likewise, the motion sensors 718, as well as the microphone(s) 708 and the gaze detection subsystem 710, also may be employed as user input devices, such that a user may interact with see-through display subsystem 704 via gestures of the eye, neck and/or head, as well as via verbal commands. It will be understood that sensors illustrated in FIG. 7 is shown for the purpose of example and are not intended to be limiting in any manner, as any other suitable sensors and/or combination of sensors may be utilized.

See-through display device 104 further comprises a computing device 720 having a logic subsystem 722 and a storage subsystem 724 in communication with the sensors, the gaze detection subsystem 710, and the see-through display subsystem 704. Storage subsystem 724 comprises instructions stored thereon that are executable by logic subsystem 722, for example, to receive image data from outward facing image sensors 706 capturing an image of a local environment of the see-through display device, and to identify a physical feature of the local environment via the image data. The instructions also may be executable to construct an augmented reality image of a virtual structure by arranging a plurality of modular virtual structure segments in adjacent locations, each modular virtual structure segment comprising a pre-computed global illumination effect, and to display the augmented reality image over the physical feature in spatial registration with the physical feature from a viewpoint of a user. The instructions may further be executable to detect a local lighting characteristic, to modulate the augmented reality image based upon the local lighting characteristic, and to display the augmented reality image over the physical feature in spatial registration with the physical feature via the see-through display subsystem 704.

Further information regarding example hardware for the logic subsystem 722, storage subsystem 724, and other above-mentioned components is described below with reference to FIG. 8.

It will be appreciated that the depicted see-through display device 104 is provided by way of example, and thus is not meant to be limiting. Therefore it is to be understood that a display device may include additional and/or alternative sensors, cameras, microphones, input devices, output devices, etc. than those shown without departing from the scope of this disclosure. The physical configuration of a display device and its various sensors and subcomponents may take a variety of different forms without departing from the scope of this disclosure.

Further, it will be understood that a computing system configured to display augmented reality imagery via a see-through display device may take any suitable form other than a head-mounted display device, including but not limited to a mainframe computer, server computer, desktop computer, laptop computer, tablet computer, home-entertainment computer, network computing device, gaming device, mobile computing device, mobile communication device (e.g., smart phone), other wearable computer, etc. It will further be understood that the methods and processes described above may be implemented as a computer-application program or service, an application-programming interface (API), a library, and/or other computer program product.

Figure 8:
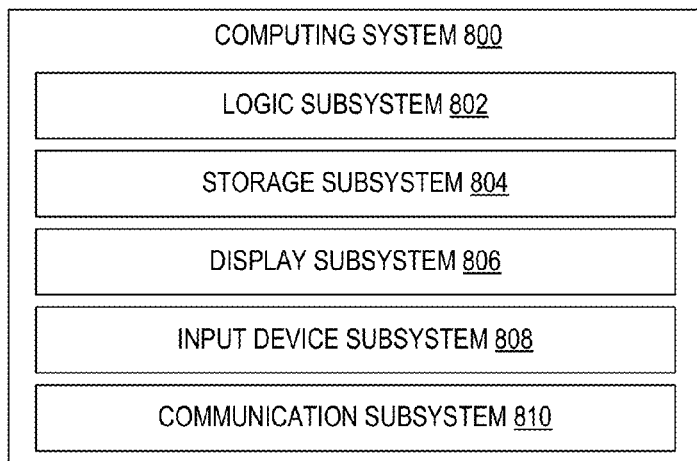
FIG. 8 shows a block diagram of an example embodiment of a computing system.

FIG. 8 schematically shows a non-limiting embodiment of a computing system 800 that can perform one or more of the methods and processes described above. Computing system 800 is shown in simplified form, and as mentioned above may represent any suitable device and/or combination of devices, including but not limited to those described above with reference to FIGS. 1-9.

Computing system 800 includes a logic subsystem 802 and a storage subsystem 804. Computing system 800 may optionally include a display subsystem 806, input device subsystem 808, communication subsystem 810, and/or other components not shown in FIG. 8. Computing system 800 may also optionally include or interface with one or more user input devices such as the above-described eye tracking system, as well as a keyboard, mouse, game controller, camera (depth and/or two-dimensional), microphone, and/or touch screen, for example. Such user-input devices may form part of input device subsystem 808 or may interface with input device subsystem 808.

Logic subsystem 802 includes one or more physical devices configured to execute instructions. For example, the logic subsystem may be configured to execute machine-readable instructions that are part of one or more applications, services, programs, routines, libraries, objects, components, data structures, or other logical constructs. Such instructions may be implemented to perform a task, implement a data type, transform the state of one or more components, or otherwise arrive at a desired result.

Logic subsystem 802 may include one or more processors configured to execute software instructions. Additionally or alternatively, logic subsystem 802 may include one or more hardware or firmware logic machines configured to execute hardware or firmware instructions. The processors of logic subsystem 802 may be single-core or multi-core, and the programs executed thereon may be configured for sequential, parallel or distributed processing. Logic subsystem 802 may optionally include individual components that are distributed among two or more devices, which can be remotely located and/or configured for coordinated processing. Aspects of the logic subsystem may be virtualized and executed by remotely accessible networked computing devices configured in a cloud-computing configuration.

Storage subsystem 804 includes one or more physical, non-transitory, computer-readable storage devices configured to hold data and/or instructions executable by the logic subsystem to implement the herein-described methods and processes. When such methods and processes are implemented, the state of storage subsystem 804 may be transformed—e.g., to hold different data.

Storage subsystem 804 may include removable media and/or built-in devices. Storage subsystem 804 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 804 may include volatile, nonvolatile, dynamic, static, read/write, read-only, random-access, sequential-access, location-addressable, file-addressable, and/or content-addressable devices. In some embodiments, logic subsystem 802 and storage subsystem 804 may be integrated into one or more unitary devices, such as an application-specific integrated circuit (ASIC), or a system-on-a-chip.

It will be appreciated that storage subsystem 804 includes one or more physical, non-transitory devices. However, in some embodiments, aspects of the instructions described herein may be propagated in a transitory fashion by a pure signal (e.g., an electromagnetic signal, an optical signal, etc.) that is not held by a physical device for a finite duration. Furthermore, data and/or other forms of information pertaining to the present disclosure may be propagated by a pure signal.

The term "program" may be used to describe an aspect of computing system 800 implemented to perform a particular function. In some cases, a program may be instantiated via logic subsystem 802 executing instructions held by storage subsystem 804. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 806 may be used to present a visual representation of data held by storage subsystem 804. This visual representation may take the form of a graphical user interface (GUI). As the herein described methods and processes change the data held by the storage subsystem, and thus transform the state of the storage subsystem, the state of display subsystem 806 may likewise be transformed to visually represent changes in the underlying data. Display subsystem 806 may include one or more display devices utilizing virtually any type of technology. Such display devices may be combined with logic subsystem 802 and/or storage subsystem 804 in a shared enclosure, or such display devices may be peripheral display devices.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. In a display device, a method of displaying an augmented reality image comprising lighting effects, the method comprising:
    receiving image data, the image data capturing an image of a local environment of the display device;
    identifying a physical surface of the local environment via the image data;
    constructing an augmented reality image of a virtual structure for display over the physical surface in spatial registration with the physical surface by fitting a first modular augmented reality image segment of the virtual structure to the surface based on a geometry of the surface by one or more of scaling, rotating, clipping, and morphing the first modular augmented reality image segment, and then positioning a second modular augmented reality image segment of the virtual structure adjacent to the first modular augmented reality image segment to form an appearance of the virtual structure, each modular augmented reality image segment comprising a pre-computed illumination effect and having an appearance of a portion of the virtual structure; and
    outputting the augmented reality image to the display device.

2. The method of claim 1, wherein identifying a physical surface of the local environment comprises performing a mesh analysis of the local environment.

3. The method of claim 1, wherein the physical surface comprises one or more of a wall and a ceiling.

4. The method of claim 1, wherein the pre-computed illumination effect comprises a pre-computed directional lighting effect.

5. The method of claim 1, wherein the pre-computed illumination effect comprises a pre-computed radiance transfer function.

6. The method of claim 1, further comprising identifying a lighting characteristic of the local environment via the image data, and modulating an appearance of the first and second modular augmented reality image segments based upon the lighting characteristic of the local environment.

7. The method of claim 6, wherein the lighting characteristic comprises a color characteristic of the local environment, and wherein modulating the appearance of the first and second modular augmented reality image segments comprises imparting the color characteristic to the first and second modular augmented reality image segments.

8. The method of claim 6, wherein the lighting characteristic comprises a location of a physical light in the local environment, and wherein modulating the appearance of the first and second modular augmented reality image segments comprises computing a light effect arising from a virtual point light at the location of the physical light.

9. The method of claim 1, wherein constructing the augmented reality image of the virtual structure comprises identifying a local lighting characteristic, and selecting a set of modular augmented reality image segments determined to have a similar pre-computed lighting effect.

10. The method of claim 1, wherein constructing the augmented reality image of the virtual structure comprises applying a connectivity constraint to select adjacent modular augmented reality image segments.

11. A computing device, comprising:
a see-through display device;
an image sensor;
a logic subsystem; and
a storage subsystem comprising instructions stored thereon that are executable by the logic subsystem to:
acquire via the image sensor image data capturing an image of a local environment of the computing device;
identify a physical surface of the local environment via the image data;
construct an augmented reality image of a virtual structure for display via the see-through display device over the physical surface in spatial registration with the physical surface by fitting a first modular augmented reality image segment of the virtual structure to the surface based on a geometry of the surface by one or more of scaling, rotating, clipping, and morphing the first modular augmented reality image segment, and then positioning a second modular augmented reality image segment of the virtual structure adjacent to the first augmented reality image segment to form an appearance of the virtual structure, each modular augmented reality image segment comprising a pre-computed illumination effect and having an appearance of a portion of the virtual structure; and
output the augmented reality image to the see-through display device.

12. The computing device of claim 11, wherein the instructions are executable to identify the physical surface of the local environment by performing a mesh analysis of the local environment, and to detect the physical surface in the form of one or more of a wall and a ceiling.

13. The computing device of claim 11, wherein the see-through display device is a wearable device, and wherein the image sensor comprises a stereo depth imaging system.

14. The computing device of claim 11, wherein the pre-computed illumination effect comprises one or more of a pre-computed directional lighting effect and radiance transfer function information.

15. The computing device of claim 11, wherein the instructions are further executable to detect a lighting characteristic of the local environment via the image data, and modulate an appearance of the first and second modular augmented reality image segments based upon the lighting characteristic of the local environment.

16. The computing device of claim 11, wherein the instructions are further executable to detect a local lighting characteristic, and select a set of modular augmented reality image segments determined to have a similar pre-computed lighting effect as the local lighting characteristic.

17. A wearable augmented reality computing device, comprising:
a see-through display device;
an image sensor;
a logic subsystem; and
a storage subsystem comprising instructions stored thereon that are executable by the logic subsystem to:
acquire via the image sensor image data capturing an image of a local environment of the computing device;
identify a physical surface of the local environment via the image data;
detect a lighting characteristic of the local environment via the image data;
construct an augmented reality image of a virtual structure for display via the see-through display device over the physical surface in spatial registration with the physical surface fitting a first modular augmented reality image segment of the virtual structure to the surface based on a geometry of the surface by one or more of scaling, rotating, clipping, and morphing the first modular augmented reality image segment, and then positioning a second modular augmented reality image segment of the virtual structure adjacent to the first modular augmented reality image segment to form an appearance of the virtual structure, each modular augmented reality image segment comprising a pre-computed illumination effect and having an appearance of a portion of the virtual structure;
modulate an appearance of the first and second modular augmented reality image segments based upon the lighting characteristic of the local environment; and
output the augmented reality image to the see-through display device.

18. The computing device of claim 17, wherein the lighting characteristic comprises one or more of a color characteristic of the local environment and a location of a physical light in the local environment, and wherein modulating the appearance of the first and second modular augmented reality image segments comprises computing a light effect arising from a virtual point light at the location of the physical light.

* * * * *